United States Patent [19]

Freeman

[11] 4,455,891
[45] Jun. 26, 1984

[54] POWER TRANSMISSION CONFIGURATION HAVING CONTINUOUS VARIABLE PROGRESSION OF GEAR REDUCTION RATIOS

[76] Inventor: Gerald A. Freeman, 205 W. Maywood, Peoria, Ill. 61604

[21] Appl. No.: 253,480

[22] Filed: Apr. 13, 1981

Related U.S. Application Data

[63] Continuation-in-part of Ser. No. 111,335, Jan. 11, 1980, abandoned.

[51] Int. Cl.³ .......................... F16H 3/44; F16H 57/10
[52] U.S. Cl. .................................. 74/793; 74/750 R; 74/687
[58] Field of Search ............... 74/793, 794, 789, 791, 74/750 R, 687

[56] References Cited

U.S. PATENT DOCUMENTS

| | | | |
|---|---|---|---|
| 1,863,621 | 6/1932 | Corner | 74/789 |
| 1,994,471 | 3/1935 | Gregory | 74/750 R |
| 2,035,054 | 3/1936 | Dürig | 74/789 |
| 2,171,610 | 9/1939 | Szekely | 74/794 X |
| 2,200,566 | 5/1940 | Szekely | 74/794 X |
| 2,218,838 | 10/1940 | Alspaugh | 74/801 |
| 2,637,219 | 5/1953 | Stewart | 74/794 X |
| 2,667,089 | 1/1954 | Gregory | 74/793 |
| 3,116,650 | 1/1964 | Farley | 74/793 |
| 3,283,612 | 11/1966 | Densham | 74/794 X |
| 3,389,767 | 6/1968 | Burkart | 74/794 X |
| 3,685,371 | 8/1972 | Crooks | 74/792 |
| 3,741,040 | 6/1973 | Shaw | 74/794 |
| 3,893,352 | 7/1975 | Cotton | 74/793 X |
| 3,918,325 | 11/1975 | Frost | 74/687 |
| 4,109,551 | 8/1978 | Nemec | 74/750 R |
| 4,189,960 | 2/1980 | Holdemon | 74/750 R |
| 4,201,098 | 5/1980 | Harvey | 74/761 |
| 4,205,563 | 6/1980 | Gorrell | 74/730 |
| 4,229,152 | 10/1980 | Wojcik | 74/750 R |

FOREIGN PATENT DOCUMENTS

| | | | |
|---|---|---|---|
| 2249774 | 4/1974 | Fed. Rep. of Germany | 74/793 |
| 2654360 | 8/1978 | Fed. Rep. of Germany | 74/793 |

*Primary Examiner*—Leslie A. Braun
*Assistant Examiner*—Lawrence J. Gotts

[57] ABSTRACT

This invention relates to a power transmission apparatus for flexibly coupling a power source to its intended torque load. This apparatus is addressed to producing an infinitely flexible ratio of gear reduction while continuously maintaining economical, solid contact gear meshings. The simultaneous selection of division ratios, and of optional torque transfer channels, while splitting the input torque provides the two torque components needed for composing the optimum output torque ratio. A plurality of dual journallings permit an annularly torqued rotation to progressively supplement and then replace, the torque from the epicyclic gear reduction rotations. Multiple progressions of infinitely variable reduction ratios selectively activate the amount of input torque energy deflected from the gear reduction apparatus, into a direct torquing of the output shaft. The continuous infinite selectivity of a controlling impedance within the meshings of the gear reduction apparatus, as it responds to external control sensors or to manual selection, determines the gear reduction ratio of the two torque supplements recombined. The ratio of gear reduction is, therefore, continuously responsive to a changing torque load.

3 Claims, 4 Drawing Figures

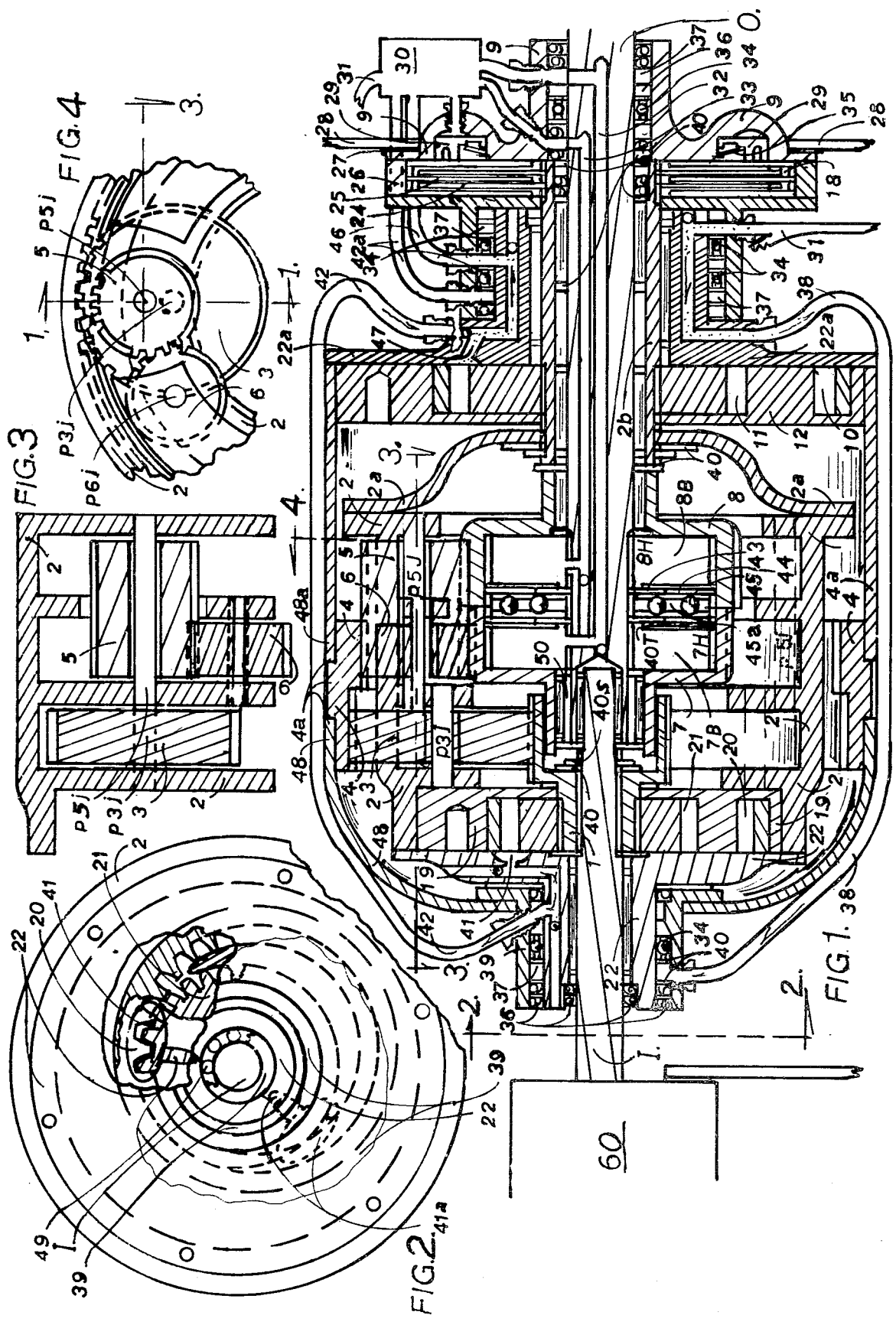

1

POWER TRANSMISSION CONFIGURATION HAVING CONTINUOUS VARIABLE PROGRESSION OF GEAR REDUCTION RATIOS

This application is a continuation-in-part of application, Ser. No. 06/111,335 filed Jan. 11, 1980 by Gerald A. Freeman, now abandoned.

BACKGROUND OF THE INVENTION

Common theories and other patent applications exemplified by U.S. Pat. Nos.: 2,035,054 dated 3-25-1935 to Durig, 2,218,838 dated 10-22-1940 to Alspaugh, 3,918,325 dated 11-11-1975 to Frost and 4,229,152 dated 10-21-1980 to Wojeick, have recognized and dwelled upon the lack of flexibility in the complex units of gear reduction, used to connect a vehicle's engine to the vehicle's drive wheels.

Many power transmissions function with persistent problems of total failure, high maintenance costs, high manufacturing costs, and high energy loss. These problems are deteriorative, brought about by excessive parts lists assembled into complex units of fluid pumps, clutches, brakes, jack shafts, and a plurality of gears, each sliding or rotating within and about one another during lengthy periods of direct drive operation.

Most transmissions must be utilized with a planned torque reserve in each given range, to provide for a "probable" load fluxuation, to avoid or accept the energy losses of a hydrokinetic unit.

The transmission here presented eliminates or utilizes a large portion of these problems. A relatively compact unit of gear reduction using a continuously flexible torque ratio rotation has minimal energy losses during gear reduction rotation because the hydrokinetic action and related heat loss is activated only as a differential torque during the controlled progression from the reduction mode to the direct-drive mode with negligible energy loss. A very low percentage of friction, wear, and energy loss results from uniting and blending all internal resistance reaction into rotational output torque. Concentric journalling converts nearly one hundred percent of the input torque into one collective rotational output torque. Two free turning rotor brake discs and one support bearing are the only sources of energy loss during the direct-drive mode.

This transmission's selectable limit of maximum gear reduction, together with its continuous flexibility, facilitates torque regulation. When a flow control 30 reacts to speed changes in load revolutions, or to changing torque load, said flow control 30 is activated to monitor and define the selectivity of this transmission's variable ratio of gear reduction torque. Governor reaction to speed changes and changing manifold pressures are examples of torque reaction available for sensor evaluation.

Uses are not limited to the automotive field. Continuously variable reduction ratios can give any diesel engine application a more efficient speed range, or give internal-combustion engines a torque load range having a lower pollution factor. It can smooth out the sudden demands of heavy earth moving equipment, yet provide economical ratios between load peaks. Reduction ratio fluxuation can compensate for slippage incurred by a "track" driving either tractors or tanks. Intentionally over compensating relative track speed ratios will provide steering action, without losing the traction of either tread, while maintaining a solid direct mechanical contact to power the output at all times.

Rotary combustion engines and gas turbines would benefit significantly from this type of gear reduction to hold torque loads within a narrow range or to limit sudden speed accelerations.

The original targets were to improve economy and operational efficiency, reduce hydrocarbon emissions, and conserve energy by eliminating excessive engine loads.

SUMMARY

An annular reduction apparatus of constantly meshing doubly interconnected planet gear configurations encased as a single rotatable unit, develops and utilizes the forward orbital reaction torque developed on a gear's journal proportional to any pitch line inhibition to that gear's torqued rotations.

A concentrically located and torqued fluid pump brake hydraulically inhibits gear reduction rotations to progressively deflect input torque through the orbiting input planet gear journals of a common journalling carrier into a direct orbital torquing of the equally inhibited output planet gears. This rotationally torques the output sun gear.

Input torque to a carrier-mounted primary fluid pump energizes a reaction torque which also traverses the planet carrier to add more forward torque to the normally reverse-biased common carrier.

Concentric journalling permits a restriction of internal epicyclic gear reduction rotations to progressively defer input torque into unitized rotations of said epicyclic gearing means as a whole. Thereby the input shaft is fixed to the output shaft as a direct-drive mode.

Flow control imposed within the secondary fluid pump reduces the rotations of said fluid pump and the dependent gear reduction rotations. The degree of rotation restraint determines the proportion of reduction action utilized. Said flow control also determines progressive ratio changes as the reduction mode progressively changes to the direct-drive mode.

That portion of the input torque no longer being transferred through the enhanced torque ratio of the reduction apparatus is converted into a direct torquing of the total unit. This direct torque becomes first a supplement to the reduction enhanced torque, and then a replacement of it.

The annular configuration of this power transmission apparatus utilizes a majority of the input energy.

Energy loss occurs at the exterior support bearing journalling the output shaft, plus any additional loss caused within the power source as it journals, supports, and torques the input shaft. All other energy directly or indirectly drives the only possible torque recipient, the output shaft. Two contiguous clutches with one common reciprocating clutch-actuating piston assembly, consisting of a thrust bearing and fluid containing splined washers, actuate the rotations of the output shaft with directional selectivity.

BRIEF DESCRIPTION OF THE FIGURES

FIG. 1 is a lateral crossectional view showing the axial relationships of an input shaft, an output shaft, a common carrier, a single ring gear, the rotational mounting of each fluid pump, and the contiguous journallings of the output clutches. This exemplary embodiment gives the relationships between the annular fluid channels and bearings needed to connect revolving fluid lines to the stationary fluid lines and permit external fluid flow control. Included are the fluid lines supplying clutch selection and activation.

FIG. 2 has a double "cut away" to display: the pump gears in relation to the fluid ports; the fluid passage drillings, providing fluid flow through the two contiguous concentric bearings; the locations of the primary fluid pump cover bearing and the ring gear support bearing.

FIG. 2 also gives another view of the annular position 10 which provides the primary fluid pump its rotary mounting upon the common carrier.

FIG. 3 is a vertical view of a horizontal "cut" showing the relative meshing positions of the planet gears upon their common journalling carrier.

FIG. 4 is a partial end view of the planet gears, the common carrier journallings which locate and support the planet gears, and the single compound ring gear.

DETAILED DESCRIPTION

Referring to FIG. 1; an input shaft I., journalled and torqued within power source 60, and also journalled in a cover 22 of a primary pump 19, rotatingly torques an input sun gear 1 fixed to the input shaft I. by a spline, a washer 40 and a snap ring 40s. The input sun gear 1 is externally splined to torque a pump gear 21. Said input sun gear 1 will also torque in sequence: one or more input planet gears 3; a compound ring gear 4; one or more output planet gears 5; a forward output sun gear 8; one or more reverse idler gears 6, which are shown as being in the crossectional plane of FIG. 1; a reverse sun gear 7; and a planet gear journalling carrier 2. These components are parts of two semi-independent planet gear arrangements functioning as a simple reduction chain of idler gears with a maximum torque increase proportional to the pitch line of the gear diameters selected.

A torque applied to the input planet gears 3 and the load reduction torque of the ring gear 4 restraining the rotations of said input planet gears 3, join to create one forward rotational reaction torque force upon carrier journals P3J of the input planet gears 3. Additional forward rotational reaction torquing of the carrier 2 is generated by the body of the primary fluid pump 19 mounted rotationally upon said planet carrier 2. This invention combines and utilizes a composite of all internal reaction torque. A secondary fluid pump as a controlled resistance, activates a reaction torquing of the planet journalling carrier 2 in its relation to the ring gear 4.

The planet carrier 2 receives a reverse torque from planet journals P5J, but fulcrum forces on the journals P5J and P3J are neutralized in the planet carrier 2. Any reverse-bias rotational torque balance is negated by the forward torque reaction of the primary fluid pump 19.

The secondary fluid pump 12 functioning as a brake, defines reduction gear rotations and progressively defers the input torque to develop an orbital torque as a unitized epicyclic gearing means.

Ring gear assembly 4a, consisting of a cover bearing 39, two cylindrical coupling devices 48 and 48a, the ring gear 4 and a body of the secondary fluid pump 12, supports fluid pump 12 in concentric annular disposition. The pump's inner gear 11 is coupled to, and is rotatingly torqued by, an axial extension 2b of planet gear journalling carrier 2. Said fluid pump 12 has an outer gear 10 in eccentric disposition with said inner gear 11.

Revolution restriction by said secondary fluid pump 12, determines and defines all gear reduction rotations within the gear reduction mechanism. Torque energy, no longer transferred through the enhanced torque ratio of the gear reduction mechanism, is diverted into torquing the free-to-revolve unitized epicyclic gearing means, as a direct-drive rotational torque.

A dual concentric journalling within a support bearing 9 permits an orbital torque to develop into a single direct rotational torquing of the output sun gear 8, as gear reduction rotations are forcefully dimished or restrained.

A flow control 30 regulates the revolutions of said fluid pump 12 by imposing a fluid flow restriction in fluid line 47. As a result the relative rotations of the compound ring gear 4 and the planet gear carrier 2 decrease and the gear reduction rotations are deferred into a direct-drive mode.

The flow control 30, by inhibiting the fluid flow of said fluid pump 12, regulates a replacement fluid flow permitting the flow volume to approach a static actuating fluid pressure as the rotation inhibiting pressure is developing within the secondary fluid pump 12. The revolution inhibited output planet gears 5 transfer all internal orbital torque from the planet journals P5J of the carrier 2, and the rotational reduction torque from the ring gear 4 to the output sun gear 8. During said transfer the orbital torque becomes first a supplement to, then relacement of, the torque transversing the meshings of the gear reduction mechanism. The progressive changes in the orbital torque within this total unit, rotating freely as a single rotary torque carrying unit, creates infinitely varible gear reduction ratio combinations.

The fluid pump 19, in conjunction with fluid tubings 38 and 42 and drillings 41 and 47, within a cover 22 and a cover 22a of the respective pumps 19 and 12, delivers pressurized fluid from a sump in an outer case 28 to the flow control 30, during gear reduction rotations.

An output shaft 0., bored and journalled over an axial projection of the input shaft I., has its directional rotation determined by either a reverse clutch 7B or a forward clutch 8B. A multisection thrust bearing assembly 45a acts as a common servo piston 45 which actuates the selected clutch when fluid pressure is supplied by the flow control 30 through respective shaft drillings 33 or 32.

Rotations of the input shaft I., and fluid pump gears 21 and 20, in conjunction with an inertial torque from the carrier 2, hydraulically pressurizes a servo motor 29 to engage a carrier retention brake 18. Fluid flow through the fluid line 42, a fluid channel 37 in the support bearing 9 and the journalling cover 22a, fluid line 42a and the flow control 30, provides and delivers the fluid pressure for a "start up" mode.

In a "neutral mode" all gears 1, 3, 4, 5, 6, 7, and 8 are rotating; carrier 2 is restrained by the brake 18, as it is during reverse mode; and gears 21, 20, 11, and 10 within pumps 19 and 12 are pumping fluid at a low pressure and a high volume, as determined by the flow control 30.

When said flow control 30 is conditioned for a "forward" power mode the carrier brake assembly 18 is released, and then further disengaged by convex spring washers 35 located between stator discs 29, to insure friction free rotations of rotor disc 4. Another convex spring washer 35 returns the deactivated annular servo motor 29.

The output sun gear 8 and reverse sun gear 7 house and containerize a forward output clutch 8B, a reverse output clutch 7B and a mutual reciprocating servo piston 45.

The channel 37 in support bearing 9 and the drilling 32 in the output shaft O. are utilized by said control 30 to hydraulically pressurize a clutch housing 7H of the clutch 7B containerized as is a housing 8H of the clutch 8B. Said housing 7H is further containerized by one spline filling bearing sleeve 50, for actuating the reciprocating servo piston 45 thus engaging the forward clutch 8B and fixing the forward output sun gear 8 to the output shaft O.

When said flow control 30 is pressurizing the output shaft drilling 33, a hydraulic pressure develops within the clutch housing 8B to engage the reverse clutch 7B and fix the reverse sun gear 7 to the output shaft O. The carrier brake 18 is also engaged to prevent a torque reaction developed by the now reversed output shaft torque load from powering an orbital spinning off resulting in useless rotations of the entire unit. Said torque load reaction, now directionally common, is reinforcing rotations of the input torque.

Torque load engagement by forward clutch 8B introduces a restraining torque load on the input shaft I. A responding power source reaction is transmuted by sensor action to lower the resistance within the flow control 30 and in the fluid pump 12. Rotations within the secondary fluid pump 12 increase and all gears revolve. Torque load rotations progressively traverse the gear reduction apparatus as revolutions of the input planet gears 3, the ring gear 4 and the output planet gears 5 transfer a high ratio of reduction-enhanced rotational torque to the output sun gear 8.

When increasing torque loads further restrain revolutions of the input shaft I., the resulting power source reaction conditions flow control 30 to increase fluid flow volume and progressively remove the static pressure previously inhibiting revolutions of the secondary pump 12. As related gear reduction rotations resume, directional control within said flow control 30 utilizes pressure developed by the resulting rotations of the primary pump 19 to maintain operating pressure.

When torque loads normalize, a related diminishing in power source reaction conditions said flow control 30 to activate a pressure building flow restriction. Said flow restriction permits fewer revolutions of fluid pump 12 and all related revolutions within the gear reduction apparatus. Directional flow control within said flow control 30 will then utilize the resulting pressure build up within the fluid pump 12 to maintain operating pressure.

The servo piston 45 includes a non-splined thrust bearing assembly 45a flanked by two outer externally-splined thrust washers 40T to encase two sets of concentric discs. A thinner disc 43 splined internally, and an outer disc 44 splined externally form a set. The two output clutches 8B and 7B and said thrust bearing assembly 45a space and contain these discs to maintain spline-related rotations of all externally splined discs within respective housings.

I claim:

1. A hydraulically controlled variable ratio transmission comprising:
    an input shaft;
    an output shaft;
    an epicyclic gearing means further comprising two semi-independent planetary gear arrangements for operatively connecting said input shaft with said output shaft;
    primary and secondary fluid pumps, each having an inner gear and an outer gear, said inner and outer gears being carried in eccentric disposition with respect to one another within respective primary and secondary pump bodies;
    said input shaft being splinably connected to an input sun gear of said epicylic gearing means, and to the inner gear of said primary fluid pump; said input sun gear being in mesh with at least one planet gear journalled upon a planet gear journalling carrier of said epicylic gearing means; said planet gear journalling carrier being integrally connected to the pump body of said primary fluid pump and also to the inner gear of said secondary fluid pump; said planet gear journalling carrier and a compound ring gear of said epicyclic gearing means dually interconnect said two semi-independent planetary gear arrangements of said epicyclic gearing means; said at least one planet gear being additionally in mesh with said compound ring gear; said compound ring gear engaging at least one output planet gear and being integrally connected to the pump body of said secondary fluid pump; and said at least one output planet gear being in mesh with a reverse planet gear meshing with a reverse sun gear, and being in mesh with a forward output sun gear;
    said output shaft having a bored end to be rotatably supported by an axially extended portion of said input shaft;
    said output sun gear and said reverse sun gear journalled upon said output shaft to be alternately and selectively fixed with said output shaft via one of two output clutches, selectively;
    said output sun gear and said reverse sun gear being bored and shaped to house and containerize said output clutches with a common servo piston further containerizing and selectively activating the said output clutches alternately;
    a carrier retention brake for selectively fixing said planet gear journalling carrier with an outer case to provide directional stabilization during start-up, neutral, and reverse modes of operation; and flow control means for directing the fluid flow from said primary fluid pump and for restricting the fluid flow from the secondary fluid pump so that the relative rotation of the inner and outer gears of the respective fluid pumps will be varied, thus effecting a continuously variable ratio change from said input shaft to said output shaft.

2. A hydraulically controlled variable ratio transmission as set forth in claim 1 wherein the two semi-independent planetary gear arrangements of said epicyclic gearing means are dually interconnected by two common integral components comprising the single compound ring gear and the single planet gear journalling carrier; said two common integral components of said two semi-independent planetary gear arrangements function jointly in concentric dispositions as said epicyclic gearing means within said hydraulically controlled variable ratio transmission.

3. A hydraulically controlled variable ratio transmission as set forth in claim 1 or 2 wherein the two semi-independent planetary gear arrangements of said epicyclic gearing means provide concentric rotational mountings for the two fluid pumps;

the primary fluid pump being rotationally mounted to provide pump revolutions and thereby develop operating pressure, only during the neutral mode and during the gear reduction mode;

the secondary fluid pump being an integral component of the epicyclic gearing means, acting as a rotational servo brake while developing static operational fluid pressue during the direct-drive mode, when selectively conditioned by the external control of the internal fluid flow within said secondary fluid pump.

* * * * *